US009298370B2

(12) United States Patent
Sarkar et al.

(10) Patent No.: US 9,298,370 B2
(45) Date of Patent: Mar. 29, 2016

(54) METHODS AND STRUCTURE FOR SELECTIVE PROPAGATION OF SAS BROADCAST (CHANGE) PRIMITIVES

(75) Inventors: Sourin Sarkar, Bangalore (IN); Ankur Mehrotra, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 835 days.

(21) Appl. No.: 13/170,526

(22) Filed: Jun. 28, 2011

(65) Prior Publication Data

US 2013/0007318 A1 Jan. 3, 2013

(51) Int. Cl.
*G06F 3/06* (2006.01)
*G06F 13/38* (2006.01)

(52) U.S. Cl.
CPC .............. *G06F 3/0607* (2013.01); *G06F 3/067* (2013.01); *G06F 3/0613* (2013.01); *G06F 3/0635* (2013.01)

(58) Field of Classification Search
CPC ..... G06F 3/0689; G06F 3/0607; G06F 3/067; G06F 13/385; G06F 3/061; G06F 3/0613; G06F 3/0635
USPC ............................................... 710/28, 36, 74
See application file for complete search history.

(56) References Cited

U.S. PATENT DOCUMENTS

| 5,761,412 | A | * | 6/1998 | Higgins | ........................ 714/4.1 |
|---|---|---|---|---|---|
| 7,401,171 | B2 | | 7/2008 | Slutz et al. | |
| 7,405,942 | B1 | | 7/2008 | Lewis | |
| 7,644,168 | B2 | | 1/2010 | Grieff et al. | |
| 2007/0274231 | A1 | | 11/2007 | Marks et al. | |
| 2008/0250176 | A1 | * | 10/2008 | Pujol et al. | .................... 710/105 |
| 2009/0007154 | A1 | | 1/2009 | Jones | |
| 2011/0289240 | A1 | * | 11/2011 | Katano et al. | ................... 710/16 |

* cited by examiner

*Primary Examiner* — Farley Abad

(57) ABSTRACT

Methods and structure for improved configuration management of a storage system. A storage system comprises one or more storage controllers coupled with a plurality of storage components (e.g., storage devices and switching components). The coupling often comprises a switched fabric communication structure. Configuration changes normally propagated throughout the components of the networked storage system are prevented by detecting temporary changes in the configuration that are restored to the original configuration within a predetermined period of time. In a Serial Attached SCSI (SAS) storage system, SAS expanders and initiators of the network may be enhanced in accordance with features and aspects hereof to prevent propagation of BROADCAST (CHANGE) primitives when a temporary configuration change is restored within the timeout period. Configuration changes may include temporary loss of link communications for a link of the expander and/or removal and insertion of a storage device coupled with the expander.

18 Claims, 3 Drawing Sheets

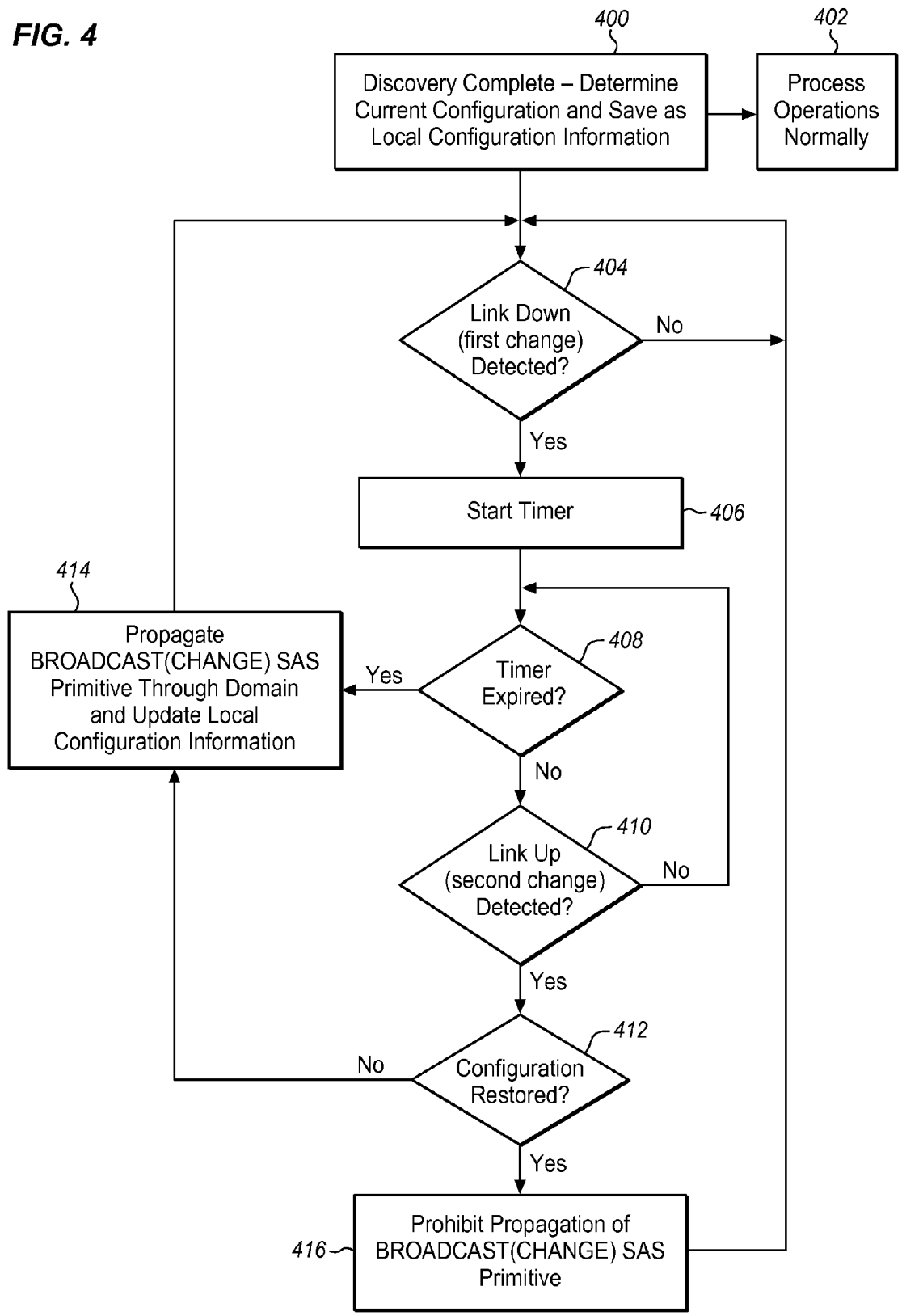

METHODS AND STRUCTURE FOR SELECTIVE PROPAGATION OF SAS BROADCAST (CHANGE) PRIMITIVES

BACKGROUND

1. Field of the Invention

The invention relates generally to Serial Attached SCSI (SAS) storage systems and more specifically relates to methods and structure to improve performance of a SAS storage system by controllably propagating and not propagating BROADCAST(CHANGE) SAS primitives responsive to changes in the SAS domain.

2. Discussion of Related Art

Storage systems comprise a number of control components coupled with a number of storage devices. In a SAS environment, a storage system may comprise one or more SAS initiators (e.g., storage controllers) coupled through a SAS fabric with a plurality of SAS targets (e.g., storage devices). The SAS fabric may comprise any number of SAS expanders (switching devices that allow any of the storage controllers to couple with any of the storage devices).

In a SAS storage system, a SAS initiator performs a SAS discovery process to determine the present configuration of the system (e.g., to discover the topology of the SAS domain by identifying all devices of the domain and the paths interconnecting the various devices). The current configuration so determined is distributed to other components of the SAS domain for purposes of determining routing of I/O requests through the fabric between a SAS initiator and a SAS target.

In accordance with the SAS standards, when a component (i.e., a SAS expander or a SAS initiator) detects a change in the current configuration of the SAS domain (e.g., a change in the components directly coupled to the initiator or expander), the component generates and transmits a SAS BROADCAST (CHANGE) primitive to other components coupled with it. The BROADCAST(CHANGE) primitive eventually will propagate up to an initiator component of the SAS domain which will, in turn, initiate a SAS Discovery process (i.e., by operation of a management client process) to determine the new configuration of components of the domain. By performing the SAS Discovery process, the initiator determines the new SAS domain configuration and, in effect, distributes the updated configuration information to other components of the SAS domain (i.e., to other initiators and expanders of the SAS domain). For example, routing tables in the SAS expanders may be updated in response to the SAS Discovery process to reflect the presence or absence of some target device and/or the addition/removal of a communication path between some devices of the domain.

The propagation of such BROADCAST(CHANGE) primitives and the associated SAS Discovery processing to update information in components of the SAS domain can consume significant processing in the SAS domain. Most importantly, performing a SAS Discovery process may delay processing of I/O requests in the domain until the Discovery process is completed.

Thus it is an ongoing challenge to reduce the overhead processing and communication bandwidth utilization in response to detected changes in the configuration of a SAS domain.

SUMMARY

The present invention solves the above and other problems, thereby advancing the state of the useful arts, by providing methods and structure for improved configuration management of a storage system. A storage system comprises one or more storage controllers coupled with a plurality of storage components (e.g., storage devices and switching components). The coupling often comprises a switched fabric communication structure. Configuration changes normally propagated throughout the components of the networked storage system are prevented by detecting temporary changes in the configuration that are restored to the original configuration within a predetermined period of time. In a Serial Attached SCSI (SAS) storage system, SAS expanders of the network are enhanced in accordance with features and aspects hereof to prevent propagation of BROADCAST(CHANGE) primitives when a temporary configuration change is restored within the timeout period. Configuration changes may include temporary loss of link communications for a link of the expander and/or removal and insertion of a storage device coupled with the expander.

In one aspect hereof, a method is provided. The method is operable in a storage controller of a storage system having a plurality of components coupled to the storage controller. The method comprises detecting a change in configuration of the storage system from a previous configuration to a new configuration. The method then senses restoration of the previous configuration of the storage system before expiration of a predetermined time period. The method then prevents reconfiguration of information in the storage controller regarding configuration of the storage system in response to sensing restoration of the previous configuration.

Another aspect hereof provides a method operable in one or more components of a Serial Attached SCSI (SAS) domain. The method comprises determining a current configuration of the SAS domain and detecting a first change in the SAS domain relative to the current configuration. The method also comprises detecting either a second change in the SAS domain that restores the current configuration or expiration of a timeout. The method then transmits a BROADCAST(CHANGE) SAS primitive from the SAS component in response to detecting the expiration of the timeout or prohibits transmission of a BROADCAST (CHANGE) SAS primitive from the SAS component in response to detecting restoration of the current configuration.

Another aspect hereof provides a SAS component in a SAS domain. The SAS component comprises a plurality of PHYs for coupling the SAS component with one or more other SAS components and a SAS protocol processor coupled with the plurality of PHYs and adapted to perform SAS protocol exchanges with other SAS components coupled with the plurality of PHYs. The SAS protocol processor is adapted to detect changes in the configuration of the SAS domain. The SAS protocol processor is further adapted to selectively prevent propagation of a BROADCAST(CHANGE) primitive in response to detected changes.

BRIEF DESCRIPTION OF THE DRAWINGS

FIGS. 3 and 4 are flowcharts describing exemplary methods in accordance with features and aspects hereof to control propagation of configuration change information through the components of a storage system.

DETAILED DESCRIPTION OF THE DRAWINGS

Figure 1:
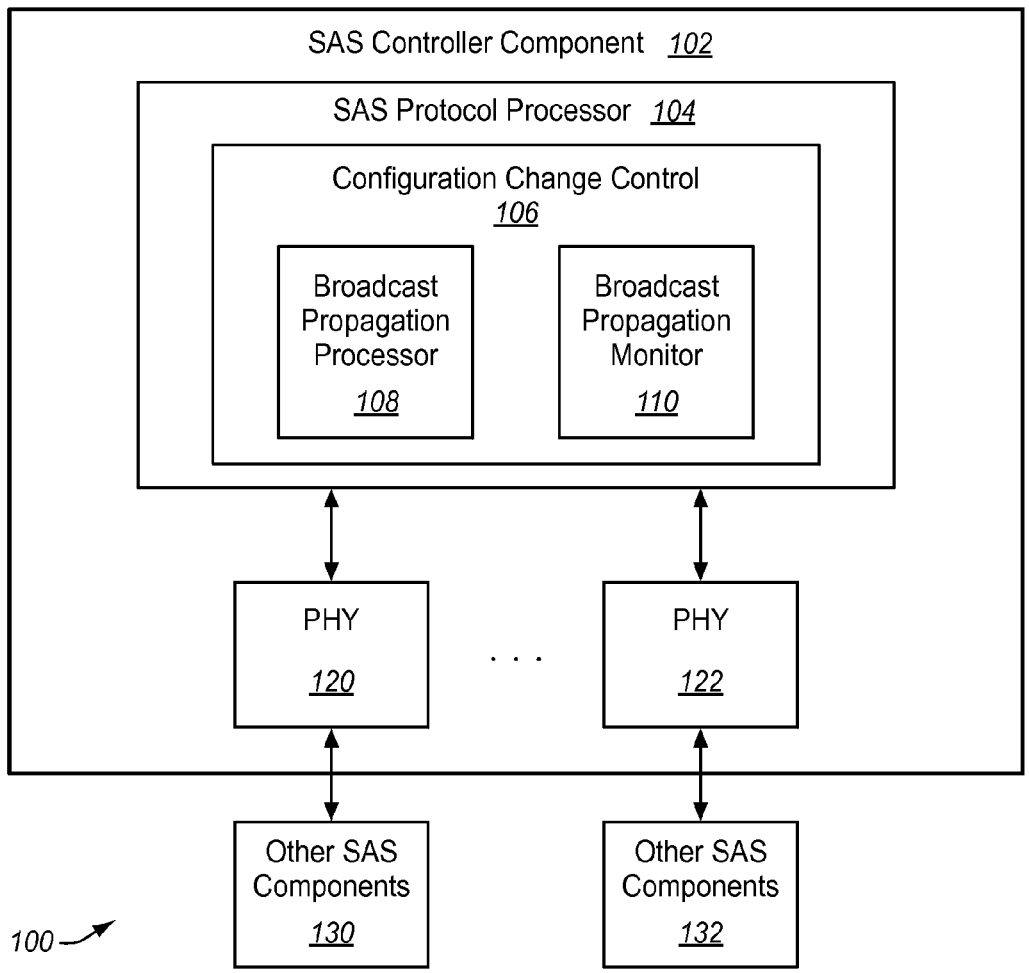
FIG. 1 is a block diagram of an exemplary storage system enhanced in accordance with features and aspects hereof to control propagation of configuration change information through the system.

FIG. 1 is a block diagram of an exemplary system 100 enhanced in accordance with features and aspects hereof to improve management of configuration changes of the storage system. System 100 may comprise a plurality of storage components including SAS storage controller component 102 coupled with one or more other SAS components 130 and 132. Although system 100 is described in terms of SAS components and protocols, those of ordinary skill in the art will readily recognize that other storage system communication architectures and protocols may similarly benefit from the present improvements. Controller component 102 may be, for example, a SAS initiator device such as a host bus adapter (HBA) or a storage controller embedded within a storage system. Further, controller component 102 may be a SAS expander. Such a SAS expander may operate at times in the role of a SAS initiator and at other times in the role of a SAS target. Other SAS components 130 and 132 may be further SAS expanders coupled to controller component 102 and/or SAS target devices such as storage devices, etc.

Controller component 102 may include a plurality of the physical link layer components such as PHY 120 and 122. Link layer components provide an interface between controller component 102 and other components 130 and 132 of storage system 100. Controller component 102 may include SAS protocol processor 104 implemented as suitable programmable logic such as a programmed general or special purpose processors and/or custom designed logic circuits for performing various protocol processing functions. SAS protocol processor 104 is adapted to perform, among other functions, desired SAS communication protocol management between controller component 102 and other components 130 and 132 via corresponding physical link layer components PHY 120 and 122, respectively.

Protocol management functions provided by protocol processor 104 in the context of a SAS environment include propagating BROADCAST(CHANGE) primitives throughout the topology of the SAS domain in response to sensing a change in the configuration of the SAS domain (e.g., detecting a change in the components directly coupled to PHYs 120 and 122 of controller 102). In accordance with SAS protocol specifications, such BROADCAST(CHANGE) primitives are propagated throughout the SAS domain in response to sensing various changes in the domain topology. Protocol processor 104 is therefore enhanced in accordance with features and aspects hereof in that it also comprises configuration change control logic 106. Configuration change control logic 106 may include broadcast propagation processor logic 108 and broadcast propagation monitor 110. Broadcast propagation monitor 110 comprises logic and/or suitably programmed instructions for detecting changes in the domain that may normally cause generation and propagation of BROADCAST(CHANGE) primitives throughout the domain. In particular, broadcast propagation monitor logic 110 may detect link-down and link-up events indicated by status information signaled by PHYs 120 and 122. When PHY 120 or 122 detects loss of communication with the corresponding other component 130 or 132, respectively, a link-down condition may be signaled and detected by broadcast propagation monitor logic 110. Broadcast propagation monitor of logic 110 then performs further logic to determine whether BROADCAST(CHANGE) primitives should be propagated throughout the domain. If a determination is made that BROADCAST(CHANGE) primitives should be sent throughout the domain, broadcast propagation monitor logic 110 signals broadcast propagation processor 108 to perform the normal SAS processing to generate and propagate a BROADCAST(CHANGE) primitive throughout the domain. Otherwise, no such BROADCAST(CHANGE) primitives will be generated and propagated.

In general, broadcast propagation monitor logic 110 is adapted to determine whether a link-down condition has persisted for a long enough period of time that it should be reported to the rest of the domain by propagating appropriate BROADCAST(CHANGE) primitives. Where a link-down condition is only a temporary loss of communications with a device coupled thereto, broadcast propagation monitor logic 110 selectively prevents/precludes such generation and propagation of BROADCAST(CHANGE) primitives due to that sensed condition. For example, if a communication cable coupling PHY 120 to a component 130 is temporarily disconnected from the target device (130), and if the temporary disconnection is within a predetermined time period, broadcast propagation monitor logic 110 prevents the generation and propagation of a BROADCAST(CHANGE) primitive throughout the domain. Or, for example, if a storage device (e.g., a target device 132) is temporarily removed from the domain and then replaced within the predetermined time period, broadcast propagation monitor logic 110 prevents generation and propagation of BROADCAST(CHANGE) primitives throughout the domain for that sensed event. On the other hand, if a loss of communications persists for a sufficiently long duration, or if a storage device is removed and the same storage device is not restored to the domain within the predetermined time period, then broadcast propagation monitor logic 110 signals broadcast propagation processor 108 to perform normal SAS processing to generate and propagate the BROADCAST(CHANGE) primitives required by the SAS specifications.

Figure 2:
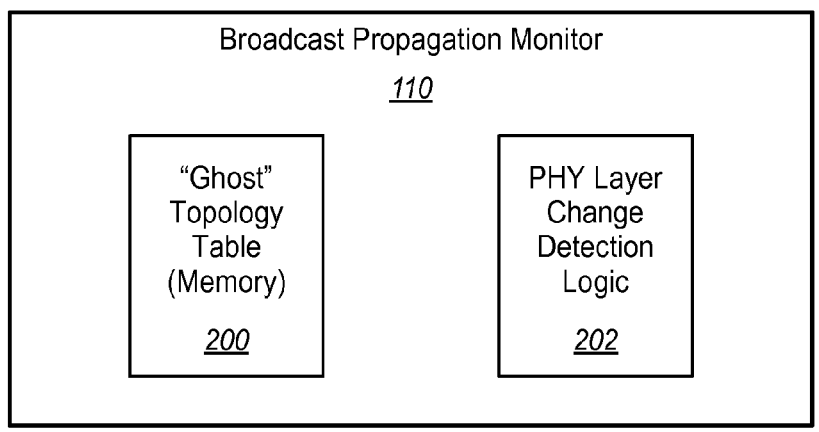
FIG. 2 is a block diagram providing exemplary additional details of the broadcast propagation monitor of FIG. 1 in accordance with features and aspects hereof.

FIG. 2 is a block diagram describing exemplary additional details of the structure of broadcast propagation monitor logic 110. Broadcast propagation monitor logic 110 may comprise any suitable memory 200 adapted for storing a topology table (also referred to herein as a "ghost topology table" or more simply "GTT"). Memory 200 may be any suitable volatile or non-volatile memory device. The GTT is generally adapted to store information regarding the presently known status and other information associated with each PHY of the SAS controller component (e.g., the initiator or expander enhanced in accordance with features and aspects hereof). In general, the GTT comprises an entry for each PHY of the SAS controller component where the entry may comprise information identifying the present connectivity status of the PHY and, if presently connected with another component, the identity of the component to which the PHY is connected. The identity of the connected device may comprise information such as that received in response to a SCSI Inquiry command. For example, a Vendor ID, a Product ID, and/or a specific serial number or GUID may be used to identify the device presently coupled to a PHY of the controller component.

The GTT 200 may be initially populated with information derived from the completed discovery process performed at initialization of the controller (e.g., the expander or initiator component enhanced in accordance with features and aspects hereof). In other exemplary embodiments, the GTT 200 may be initially populated by a process to identify all devices coupled to the controller (e.g., devices coupled to an initiator or expander enhanced in accordance with features and aspects hereof) in addition to the start of day SAS discovery process. Information in GTT 200 may be updated as the broadcast propagation monitor 110 senses particular events or status changes for one of the PHYs of the storage controller component. In particular, broadcast propagation monitor 110 may include PHY layer change detection logic 202 adapted to interact with the PHY logic layers of the controller component and adapted to detect changes in the status of the various PHYs of the controller. Still more specifically, PHY layer change detection logic 202 may comprise any suitable logic circuits and/or programmed instructions for detecting changes in the connectivity status of each of the PHYs of the storage controller component. When a change is detected (e.g., link-up or link-down conditions, device insertion or removal conditions, etc.), PHY layer change detection logic 202 may update information in GTT 200 to indicate detection of such a condition.

The GTT information may also comprise timing information regarding the time of the change in the detected status. For example, when a link-down condition of a PHY is detected by PHY layer change detection logic 202, the corresponding entry in GTT 200 may be updated to reflect the link-down condition and the time of such detection. When the link-up condition is later detected by PHY layer change detection logic 202, GTT 200 may be further updated to correct the status of the corresponding PHY to indicate that its link has been restored. The previously stored timing information may also be used to determine the duration of the link-down condition. In like manner, when a device is removed, PHY layer change detection logic 202 updates GTT 200 to indicate removal of a previously identified device (and presumably also an indication of a link-down condition). When the same device is later inserted, PHY layer change detection logic 202 updates GTT 200 to indicate the restored identity of the storage device detected as inserted. If the inserted device provides an identity different than that which was previously recorded in GTT 200, PHY layer change detection logic 202 may signal a detected change that requires propagation of a BROADCAST(CHANGE).

Figure 3:
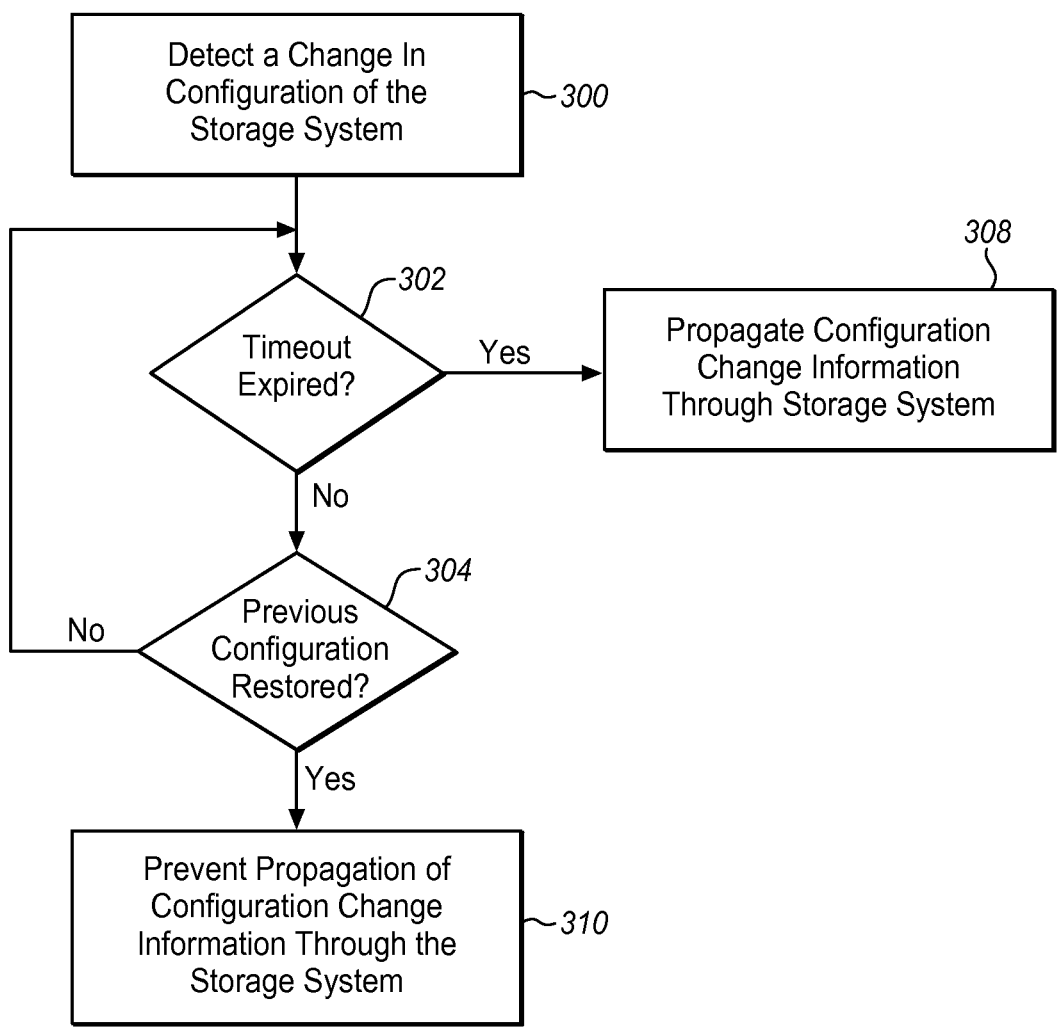

Those of ordinary skill in the art will readily recognize numerous additional and equivalent elements in fully functional systems and components such as those described in FIGS. 1 and 2. Such additional and equivalent elements are omitted here in for simplicity and brevity of this discussion FIG. 3 is a flowchart describing an exemplary method for improved configuration change management in a storage system. The method of FIG. 3 may be operable in systems such as those described in FIGS. 1 and 2 above. At step 300, a component of the storage system detects a change in the configuration of the storage system. As noted above, a storage controller component may utilize monitoring logic associated with its link layer and PHY layer logic to detect changes on physical links (e.g., SAS PHYs). More specifically, any status reported from a physical link may be compared to a stored version of the current configuration of the storage system (e.g., a GTT stored in a memory of the controller) to determine whether the indicated status represents a change in the configuration of the storage system.

Having so detected such a change, step 302 next determines whether a predetermined timeout period has expired. If so, step 308 performs standard processing in accordance with the protocols utilized within the storage system (e.g., SAS protocols) to propagate configuration change information throughout the storage system. For example, in the context of a SAS domain storage system, a BROADCAST(CHANGE) primitive may be generated and propagated throughout all of the components of the SAS domain.

If step 302 determines that the predetermined timeout period has not yet expired, step 304 determines whether the newly detected change represents restoration of the previous configuration of the storage system (e.g., following an earlier detected change and prior to the expiration of the predetermined timeout period). If so, step 310 prevents propagation of configuration change information throughout the storage system. In particular, in the context of a SAS domain, step 310 simply avoids the generation and propagation of a BROADCAST(CHANGE) primitive throughout the SAS domain having recognized that the previous configuration of the storage system has been restored by the newly detected change.

Thus, the method of FIG. 3 generally determines whether a detected change is merely a temporary reconfiguration of the storage system that need not cause propagation of configuration change information throughout the storage system. A "temporary change" is a change to the configuration of the storage system domain that is restored to its prior configuration status before expiration of a predetermined timeout period. Where such a change is detected as merely a temporary reconfiguration (e.g., within the duration of a predefined timeout), then the method prevents unnecessary propagation of the configuration change information. Otherwise, if the detected change is not a temporary reconfiguration, standard processing to generate and propagate configuration change information is performed (e.g., SAS BROADCAST (CHANGE) primitives propagated through the entirety of a SAS domain). By preventing such un-necessary propagation of change information, unnecessary discovery processes in the storage domain may be avoided thus saving overhead processing time and communication bandwidth in the storage domain.

FIG. 4 is a flowchart described describing another exemplary method in accordance with features and aspects thereof to improve management and control of the propagation of configuration change information in the context of a SAS storage system environment. The method of FIG. 4 may be performed by systems such as those described in FIGS. 1 and 2 above. The method of FIG. 4 is similar to that described above with respect to FIG. 3 and provides some additional details relating to the particular application of the method to a SAS storage system environment.

At step 400, the storage system completes normal SAS discovery process to determine the current configuration of the SAS storage system. The current configuration so determined in the discovery process may be saved locally within each initiator or expander component of the SAS storage system (e.g., saved within any components of the SAS storage system that have "end devices" or "target devices" directly coupled thereto). In general, discovery processing is performed at start of day initialization of the SAS storage system and, in accordance with SAS specifications, may be performed in response to receipt of a BROADCAST(CHANGE) primitive propagated throughout the components of the storage system. Following completion of the discovery process normal processing of the SAS component proceeds as indicated by step 402. In addition, and substantially concurrent with normal communications processing of step 402 within the SAS storage system, steps 404 through 416 are iteratively operable to detect changes in the configuration of the SAS storage system and to prevent or permit propagation of change information throughout the SAS domain. In other words, steps 404 through 416 serve to monitor changes in the SAS domain configuration and determine whether and when to generate BROADCAST(CHANGE) primitives to be propagated through the SAS domain.

At step 404, the method awaits detection of a first change in the configuration of the SAS domain as indicated by a link-down status change in one of the PHYs of the controller component performing the method. Upon detection of such a link-down status change (a first change in the current configuration), step 406 starts a timer representing a predetermined timeout period. Steps 408 and 410 are then iteratively operable to detect either expiration of the timeout period or a second change in the configuration of the storage system. More specifically, step 408 determines whether the predetermined timeout period has expired. If not, step 410 is operable to determine whether a second change in the configuration of the SAS domain has been detected. If not, processing continues looping back to step 408 awaiting either the expiration of the timeout period or the detection of another (second) change to the configuration.

If step 408 determines that the timeout period has expired, step 414 generates a BROADCAST(CHANGE) primitive and propagates the primitive throughout the SAS domain in accordance with standard SAS specifications. In addition, step 414 updates the locally saved current configuration information to reflect the apparently persistent change in the configuration of the SAS domain (e.g., the first change detected by step 404).

Step 410 may detect a second change in the configuration of the storage system. For example, in the context of a SAS storage system, a second change may be indicated as a link-up condition for the same PHY previously detected as a link-down condition at step 404. Upon detection of a second such change in the configuration of the storage system (e.g., detecting a link-up status change), step 412 determines whether the detected second change restores the previous configuration of the storage system (i.e., the configuration prior to sensing the first change at step 404). If the detected second change did not restore the previous configuration (within the timeout period), step 414 generates and propagates a BROADCAST (CHANGE) SAS primitive in accordance with standard SAS specifications. If step 412 determines that the detected second change has restored the previous configuration, step 416 prohibits propagation of the BROADCAST(CHANGE) SAS primitive normally generated by systems devoid of features and aspects hereof. In both cases (i.e., after step 414 or step 416), processing continues looping back to step 404 to await detection of a first change on a particular PHY.

Those of ordinary skill in the art will readily recognize that the method described by step 404 through 416 of FIG. 4 represents processing for monitoring of a single PHY. Essentially the identical method may be performed for each of the plurality of PHYs present in a typical SAS controller component.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a storage controller of a storage system having a plurality of components coupled to the storage controller, the method comprising:

detecting, by operation of the storage controller, a change in configuration of the storage system from a previous configuration to a new configuration;

sensing, by operation of the storage controller, restoration of the previous configuration of the storage system before expiration of a predetermined time period; and selectively preventing propagation of a BROADCAST (CHANGE) primitive in response to detected changes in configuration, if the previous configuration is restored before expiration of the predetermined period of time.

2. The method of claim 1
wherein the step of detecting a change further comprises detecting decoupling of a storage component coupled with the storage controller in the previous configuration, and wherein the step of sensing restoration further comprises sensing re-coupling of the decoupled storage component.

3. The method of claim 1
wherein the step of detecting a change further comprises detecting a link-down status for a link coupling the storage controller to a storage component, and wherein the step of sensing restoration further comprises sensing a link-up status for the link.

4. The method of claim 1
wherein the storage system comprises a Serial Attached SCSI (SAS) storage system and wherein the storage components comprise SAS storage components.

5. The method of claim 1
wherein the storage controller comprises a SAS initiator.

6. The method of claim 1
wherein the storage controller comprises a SAS expander.

7. A method operable in one or more components of a Serial Attached SCSI (SAS) domain, the method comprising:

determining, within a SAS component of the SAS domain, a current configuration of the SAS domain;

detecting, within the SAS component, a first change in the SAS domain relative to the current configuration;

detecting, within the SAS component, either a second change in the SAS domain that restores the current configuration or expiration of a timeout; and selectively preventing propagation of a BROADCAST (CHANGE) primitive in response to detecting restoration of the current configuration before expiration of the timeout.

8. The method of claim 7
wherein the step of detecting the first change further comprises detecting a link-down condition on a PHY of the SAS component, and wherein the step of detecting the second change further comprises detecting a link-up condition on the PHY.

9. The method of claim 8
wherein the current configuration comprises information identifying a particular device coupled with the PHY, and wherein the step of detecting the link-up condition further comprises detecting that the particular device is still coupled with the PHY.

10. The method of claim 7
wherein the step of determining the current configuration further comprises performing, by operation of a SAS initiator component of the SAS domain, a SAS discovery process to discover all components of the SAS domain.

11. The method of claim 7 further comprising:
performing, by operation of a SAS initiator component of the SAS domain, a SAS discovery process to discover all components of the SAS domain wherein the SAS discovery process is performed at initialization of the SAS domain, wherein the step of determining the current configuration further comprises determining the current configuration based on information derived from the SAS discovery process.

12. A Serial Attached SCSI (SAS) component in a SAS domain, the SAS component comprising:
a plurality of PHYs for coupling the SAS component with one or more other SAS components; and
a SAS protocol processor coupled with the plurality of PHYs and adapted to perform SAS protocol exchanges with other SAS components coupled with the plurality of PHYs,
wherein the SAS protocol processor is adapted to detect changes in configuration of the SAS domain, and
wherein the SAS protocol processor is adapted to selectively prevent propagation of a BROADCAST (CHANGE) primitive in response to detected changes if the SAS protocol processor detects that the configuration has been restored within a period of time.

13. The SAS component of claim 12
wherein the SAS protocol processor further comprises:
a broadcast propagation monitor adapted to detect changes in configuration of the SAS domain; and
a broadcast propagation processor coupled with the broadcast propagation monitor and adapted to selectively prevent propagation of a BROADCAST(CHANGE) primitive in response to detected changes.

14. The SAS component of claim 13
wherein the broadcast propagation monitor further comprises:
a memory adapted to store configuration information in a topology table wherein the configuration information is used within the component to detect changes in configuration of the SAS domain,
wherein the broadcast propagation monitor is further adapted to update information in the topology table responsive to detecting a change in configuration of the SAS domain,
wherein the broadcast propagation monitor is further adapted to propagate a BROADCAST(CHANGE) primitive in response to detecting a change in the topology table that persists longer than a predetermined timeout period, and
wherein the broadcast propagation monitor is further adapted to prevent propagation of a BROADCAST (CHANGE) primitive in response to detecting a change in the topology table that persists shorter than a predetermined timeout period.

15. The SAS component of claim 13
wherein the broadcast propagation monitor further comprises:
a PHY layer change detection logic module adapted to detect a change in configuration of the SAS domain.

16. The SAS component of claim 15
wherein the PHY layer change detection logic module is further adapted to detect removal of a SAS target component directly coupled with the SAS component, and
wherein the PHY layer change detection logic module is further adapted to detect insertion of a SAS target component directly coupled with the SAS component.

17. The SAS component of claim 12
wherein the SAS component is a SAS expander.

18. The SAS component of claim 12
wherein the SAS component is a SAS initiator.

* * * * *